W. W. ROSENFIELD.
WEIGHING MACHINE.
APPLICATION FILED AUG. 26, 1905.

1,049,535.

Patented Jan. 7, 1913.

3 SHEETS—SHEET 1.

Witnesses

Inventor
William W. Rosenfield
By his Attorneys

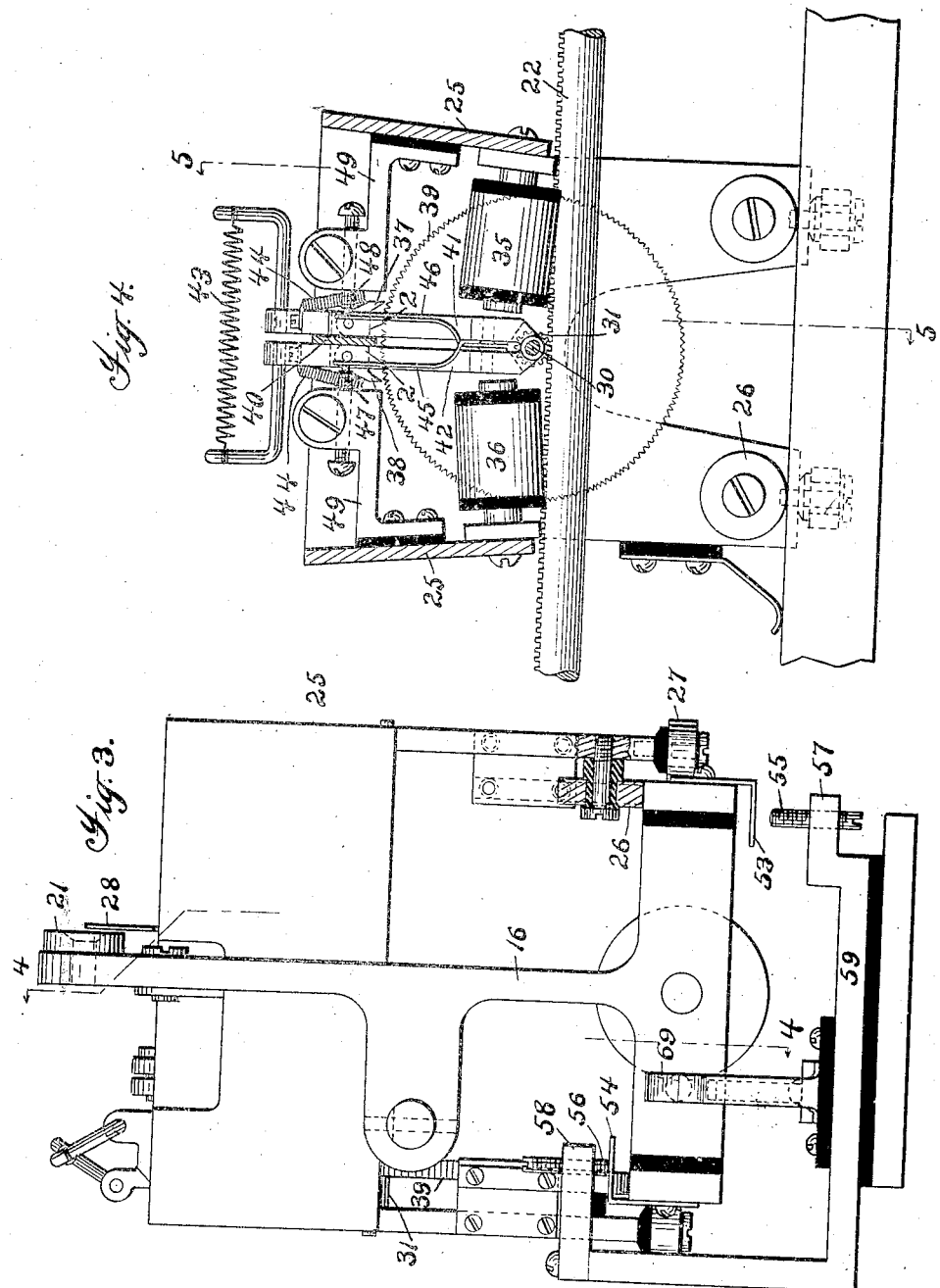

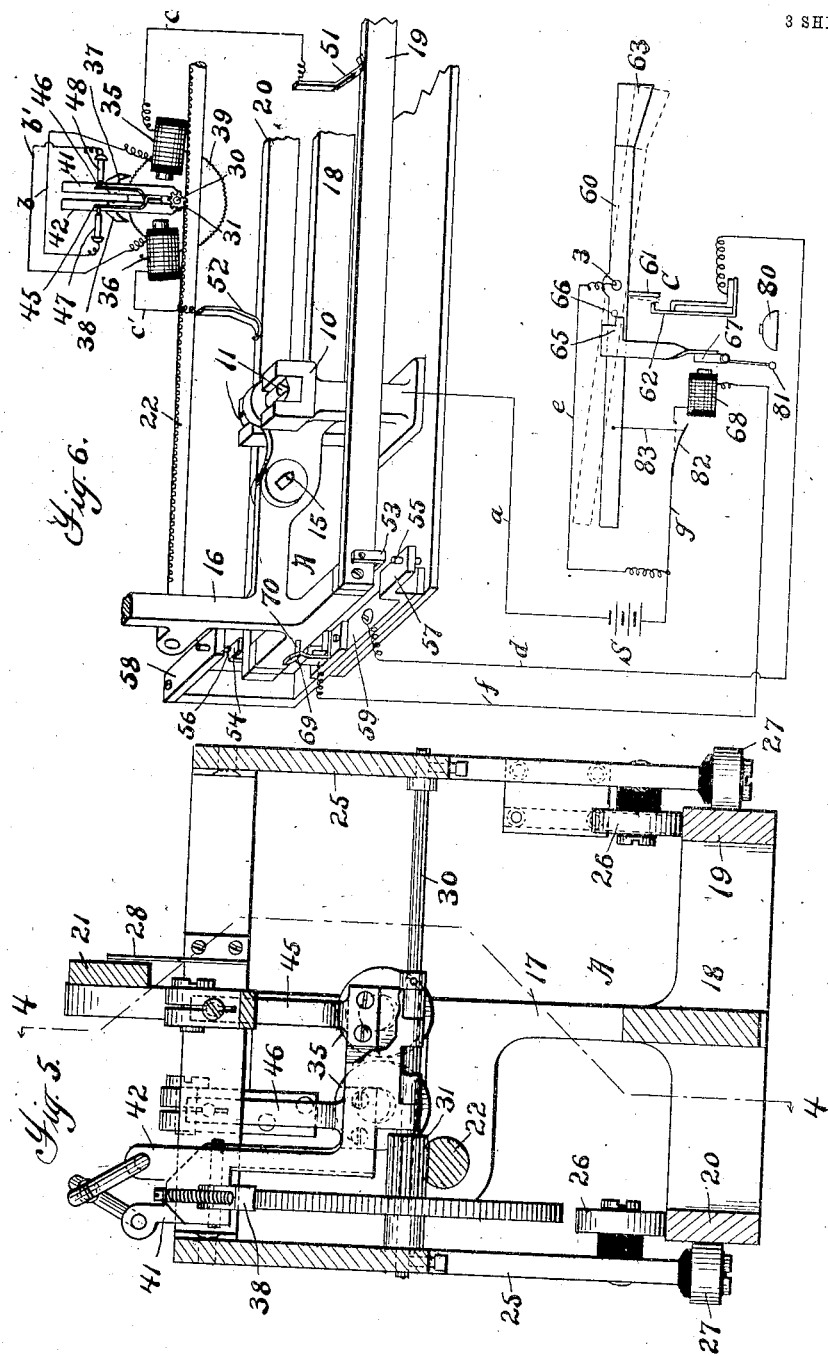

UNITED STATES PATENT OFFICE.

WILLIAM W. ROSENFIELD, OF NEW YORK, N. Y.

WEIGHING-MACHINE.

1,049,535.   Specification of Letters Patent.   Patented Jan. 7, 1913.

Application filed August 26, 1905. Serial No. 275,859.

*To all whom it may concern:*

Be it known that I, WILLIAM W. ROSENFIELD, a citizen of the United States, residing at New York city, county of New York, and State of New York, have invented certain new and useful Improvements in Weighing-Machines, fully described and represented in the following specification and the accompanying drawings, forming a part of the same.

This invention relates to self poising beam scales, that is, beam scales in which the poise is automatically moved along the beam and comes to rest in the position in which the beam balances.

The present invention aims to provide a beam scale of this class which shall be accurate and reliable in operation, simple in construction, and not liable to get out of order.

The invention aims further to provide a coin or check controlled scale of this class, such that the mechanism having made one weighing operation after the insertion of a check will be prevented from operating again until after the insertion of another check.

A full understanding of the invention can best be given by a detailed description of a construction embodying all the features of the invention in the preferred form, and such a description will now be given in connection with the accompanying drawings showing such a preferred construction.

Figure 1:
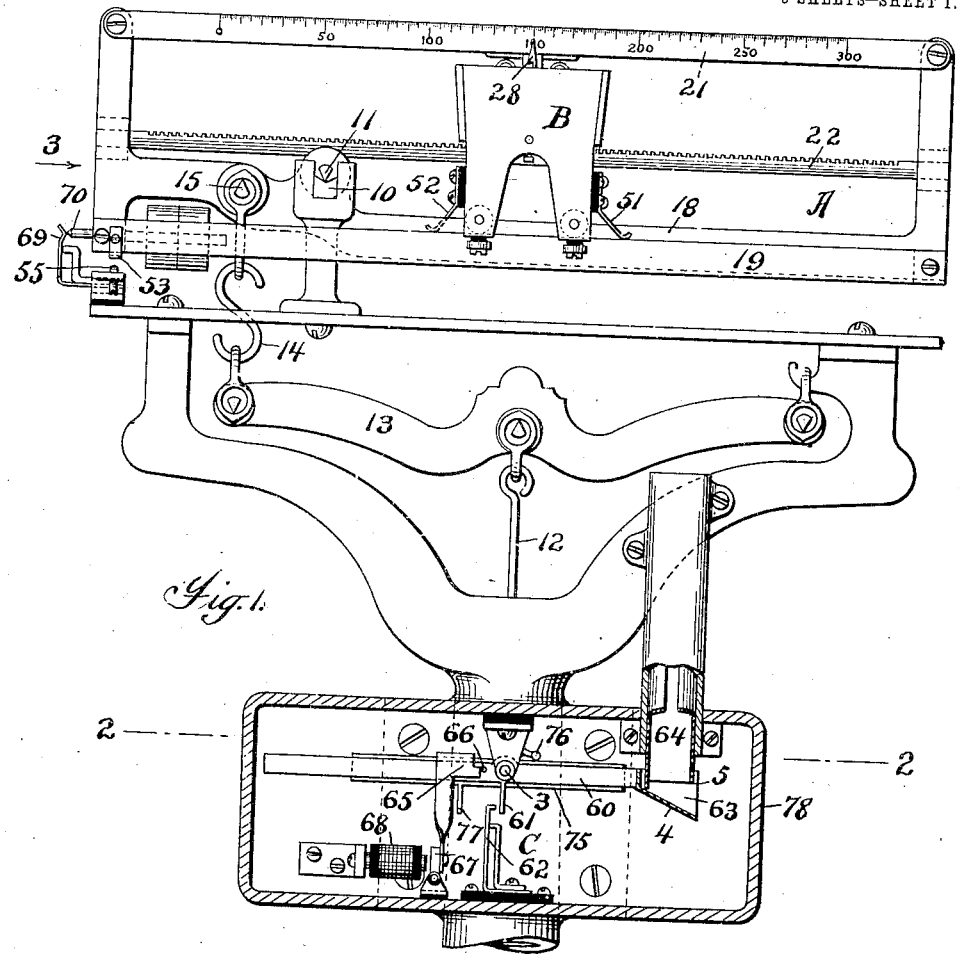
Figure 2:
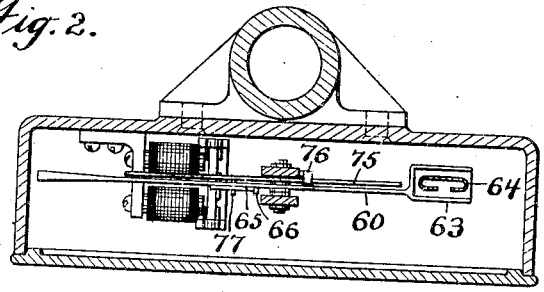

In said drawings: Figure 1 is a front elevation of the head or upper part of the scale with parts shown in section. Fig. 2 is a section on line 2 of Fig. 1. Fig. 3 is an end elevation looking in the direction of the arrow 3 on Fig. 1 with parts in section. Fig. 4 is a section on line 4 of Figs. 3 and 5. Fig. 5 is a section on line 5 of Fig. 4. Fig. 6 is a view of the scale beam and supporting frame shown in perspective with the operating mechanism of the poise, the coin mechanism and electric circuits shown diagrammatically.

Referring to the drawings, A represents the scale beam which is fulcrumed on a bearing 10 by means of knife edges 11 in the usual manner and is connected with the platform (not shown) or other device for supporting the person or article to be weighed through a connecting rod 12, cross lever 13 and connecting links 14 drawing downward on reverse knife edges 15. The scale beam as shown comprises a main beam or bar 18 which carries the knife edges 11 and 15, end pieces or frames 16 and 17 carried by the bar 18, and side supporting bars 19 and 20, an indicating or scale bar 21 and a rack bar 22 extending between the end frames. The supporting bars 19 and 20 are insulated from the end frames and form part of the operating circuits, as hereinafter described.

The poise B is formed preferably of a hollow frame or box-like casing 25 within which the operating mechanism for moving the poise is located, and is supported and guided on the bars 19 and 20 by means of supporting rolls 26 and guiding rolls 27, said rolls being insulated from the frame 25 for the purpose of avoiding electrical connection between the poise and the supporting bars. The poise carries an upwardly pointing indicating finger 28 for indicating the weight on the scale bar 21 when the poise is in balancing position. Mounted in the poise frame, is a shaft 30 extending at right-angles to the rack bar 22 and carrying a pinion 31 which meshes with the rack bar. This shaft 30 is rotated by motor mechanism mounted within the poise for causing the poise to travel along the beam. Such motor mechanism consists, preferably, and as shown, of two oppositely mounted electro-magnets 35 and 36, by which pawls 37 and 38 are reciprocated to cause the shaft 30 to rotate through a wheel 39 with the periphery of which said pawls engage, the wheel and shaft being rotated in one direction to cause the poise to move toward the outer end of the beam by the pawl 37, and being rotated in the opposite direction to cause the poise to move toward the inner end of the beam by the pawl 38. The pawls 37 and 38 are carried by armature levers 41 and 42 respectively, pivotally mounted on the shaft 30 and normally held in their retracted positions against a stop plate 40, as shown in Fig. 4, by means of a spring 43, against the tension of which spring the armature levers are moved by the magnets to give the pawls their forward or feeding movements. The pawls are preferably spring pressed into position to engage with the periphery of the wheel 39, as by means of light coiled springs 44 which are mounted on the armature levers to bear lightly against the pawl. The peripheral face of the wheel 39 is preferably formed with fine teeth or corrugations the pawls being of proper form to engage such corrugated face, but it will be understood that the invention is not to be limited to the use of pawls of the form shown and a toothed or roughened engaging surface for the pawls to engage.

In order that the rotation of the wheel 39 by either one of the pawls 37 or 38 when one of the armature levers is reciprocated shall not be prevented by the other of said pawls, means are provided for holding the pawls out of engagement with the periphery of the wheel 39 when the armature levers are in their normal or retracted position. For this purpose the pawls are provided with shoulders 2 which, when the armature levers are retracted engage the stop plate 40, thereby throwing the pawls upward to the position shown in Fig. 4 so as to clear the periphery of the wheel 39. When either of the motor magnets 35 or 36 is energized therefor to cause the corresponding armature lever to reciprocate, the rotation of the wheel 39 carried by such lever will not be interfered with by the other pawl.

The armature lever 41 carries a contact spring 45 which, when the lever is in its normal or retracted position, engages the end of a contact screw 47, which contact spring and screw are included in the circuit to the magnet 35; and the armature lever 42 carries a similar contact spring 46 which, when the lever 42 is in its normal position engages the end of a contact screw 48, this contact spring and screw being included in the circuit to the magnet 36. The contact screws 47 and 48 are carried by insulated brackets 49 in which they are mounted so as to be adjustable toward and away from their respective contact springs, and their adjustment will be such that by the forward movement of the armature lever the contact spring will be carried out of contact with the screw to break the circuit to the magnet in the manner customary for securing a rapid reciprocating of the respective armatures when the circuits to the magnets are closed.

One end of the coils of magnet 35 is in electrical connection with the supporting bar 19 through a contact spring 51 mounted on but insulated from the poise frame and which makes sliding contact with the bar 19, and one end of the coils of magnet 36 is electrically connected with the supporting bar 20 by means of a similar contact spring 52 also carried by and insulated from the poise frame and which makes sliding contact with the bar 20. The other end of the coils of each of the magnets 35 and 36 is in connection with one pole of the battery or other suitable source of electrical energy through the contact screws 47 and 48 and contact springs 45 and 46 respectively, and thence through the rack bar 22, bar 18 and fulcrum 10, as shown in Fig. 6. The circuit is completed to the other pole of the battery from the supporting bars 19 and 20 by means of contact devices controlled by the movement of the scale beam so that when the beam is raised, that is, when its outer or right hand end in Fig. 1 is up, the circuit to the magnet 35 will be closed, and when the beam is depressed the circuit to the magnet 36 will be closed. For the purpose of thus controlling the circuits to the two motor magnets, the supporting bar 19 carries a contact device 53 which when the outer end of the scale beam is raised engages an adjustable contact 55 to close the circuit to the magnet 35, and the supporting bar 20 carries a contact device 54 which when the outer end of the scale beam is depressed engages an adjustable contact device 56 to close the circuit to the magnet 36. The contacts 55 and 56 are preferably formed by screws threaded in metallic brackets 57 and 58 carried by an insulated metallic bar 59 through which electrical connection is made to such contacts.

The operation of the scale as so far described which will be understood from the foregoing description, is briefly is follows:—Supposing the bar 59 to be in electrical connection with the fulcrum 10 through a battery or other suitable source of electrical energy, and supposing the poise to be at the zero point, that is, in position to balance the beam when there is no weight on the platform; then, if the person or article to be weighed be placed on the platform the outer end of the beam will be raised, thereby bringing the contacts 53 and 55 together and closing the circuit to the magnet 35, by which magnet the armature lever 41 will be reciprocated and the wheel 39 and shaft 30 rotated through the action of the pawl 37, and the poise will move along the beam toward its outer end. Such movement of the poise will continue until it reaches a point where its weight causes the beam to swing downward thereby raising the contact 53 away from the contact 55 and breaking the circuit to the magnet 35, whereupon the outward movement of the poise will cease. If the scale beam after moving slightly downward under the influence of the outwardly moving poise should again rise and close the circuit to the magnet 35 through the contacts 53 and 55, the poise would then make a further movement outward so long as such contacts remained together, that is, until the beam again oscillated downward. If, on the other hand, the poise should run beyond the position of balance before coming to rest, the beam would fall too far and the circuit to the motor magnet 36 would be closed through the contacts 54 and 56 and the poise would move backward until the beam rose again thereby separating these contacts and breaking the circuit to the magnet 36. So long, therefore, as the beam continues to oscillate and close the circuit to either one of the motor magnets, the poise will continue to shift itself until it reaches the proper point of the beam and the beam rests in its balanced position, when the pointer 28 will indicate on the scale bar 21 the weight of the person or article being weighed. The poise will then remain stationary until the weight on the scale platform is changed or removed, and upon the removal of the weight the beam will descend and close the circuit to the motor magnet 36 through the contacts 54 and 56 and the poise will move inward on the beam until it reaches the zero position when the beam will be again balanced and the circuit to both motor magnets opened. By properly proportioning the beam and the poise and properly positioning the knife edges 11 and 15 and adjusting the contacts 55 and 56, the poise when driven by a reciprocating driving device in accordance with my invention, may be made to come to rest in the position of balance without making any backward or reverse movement.

In a check or coin controlled scale of this class it is desirable that the poise shall make its automatic balancing movements only after a check or coin has been inserted, and that after the person or article has been weighed the scale shall be automatically prevented from operating again until another check is inserted. Coin controlled mechanism including features of the invention for securing this result is shown in the drawings, and such mechanism will now be described.

The electrical connection between the bar 59 and the fulcrum 10 which forms a part of the circuit to the motor magnets 35 and 36 is controlled by means of a switch C, which switch is actuated for closing the circuit through the operation of a coin actuated lever 60. The switch as shown comprises a contact finger 61 carried by the lever 60 and a contact spring 62 with which the finger 61 makes contact when the lever is moved to the position shown by dotted lines in Fig. 6. The lever 60 is preferably arranged horizontally, being pivoted at 3, and carries at one end an open ended cup 63 and has its other end extended or weighted to hold the cup 63 normally in the position shown in Fig. 1 beneath the end of the coin chute 64 so that a coin dropped from the chute will strike the cup and tilt the lever, thereby moving the contact finger 61 into engagement with the spring contact 62. The cup 63 for receiving the check is preferably formed with an inclined bottom 4 and an open end, as shown, so that when the lever is tilted so as to carry the coin below the edge 5 of the chute the coin will roll or fall out of the open end of the cup. In order to prevent the lever from returning to its normal position when the coin falls from the cup and thereby immediately breaking the circuit to the motor magnet, a latch 65 is provided which when the lever 60 is tilted enters beneath a pin 66 on the lever to hold the lever in its tilted position with the contact finger 61 in engagement with the contact spring 62. To provide for retracting the latch and releasing the lever 60 when the beam has been balanced by the movement of the poise, the latch is preferably carried by a pivoted armature 67 which is moved by an electro-magnet 68 for the purpose of retracting the latch, the energizing circuit of which magnet includes a contact device whereby the circuit is closed when the beam is in its balanced position. Such contact device preferably consists of a contact spring 69, which is shown as mounted on but insulated from the bar 57, and a contact finger 70 carried by and in electrical connection with the scale beam. The contact spring 69 and the contact finger 70 have their engaging portions so formed and are so positioned that the contact finger will be in engagement with the spring when and only when the beam is in its balanced position.

Means are preferably provided for preventing the coin lever 60 from becoming locked in its inclined position if it should be caused to swing to such position by vibration or jarring of the scale. Such means comprises preferably a bar or lever 75 pivoted to oscillate about the axis of the lever 60 but independently thereof weighted at the same end as the lever 60 and normally held in the position shown in Fig. 1 by means of a stop 76, so that if the scale be jarred so as to cause the overweighted end of the lever 60 to swing upward the overweighted end of this bar 75 will also swing upward, and this bar carries a finger 77 in position to engage the latch 65 when the overweighted end of the bar swings upward, thereby preventing the latch from moving forward to enter beneath the pin 66. When, however, the lever 60 is moved by a coin dropped from the chute 64 there will be no corresponding movement of the lever 75 and the latch will be free to enter beneath the pin 66 and thereby lock the lever 60 in its inclined position with the contact finger 61 in engagement with the spring 62 to close the motor circuits.

The coin controlled switch and releasing mechanism just described is preferably arranged in a box or casing 78 mounted on the standard of the scales just below the head.

Means are preferably provided for making a signal upon the balancing of the beam, and for this purpose there is preferably provided a signaling device operated by the movement of the armature 67. Fig. 6 shows a bell 80 which is sounded by a striker 81 carried by the armature 67 so that when the armature is attracted by the magnet 68 to release the coin lever 60 when the circuit to the magnet is closed by the balancing of the scale beam the bell will be sounded. In order that the striking of the bell shall occur only on the completion of a weighing operation and that the movement of the scale beam to its balanced position at other times shall not cause the signal to be made, the circuit to the magnet 68 is provided with a switch, or circuit opening and closing device, 82, which is normally open, as shown in full lines in Fig. 6, and which, as by means of a connection 83 with the coin lever 60, is closed when the coin lever 60 is in the position to close the switch C, as shown in dotted lines in Fig. 6. The circuit to the magnet 68 will thus be in condition during the weighing operation to be closed for energizing the magnet when the contact finger 70 is brought into engagement with the contact spring 69 by the balancing of the beam, and the armature 67 will thereby be attracted to release the coin lever 60 and to cause the signal to be given by the striking of the bell 80. By the return movement of the lever 60, however, the circuit to the magnet 68 will be again broken at the switch 82 so that the magnet will not be energized again by the balancing of the beam until the coin lever 60 has been again moved preparatory to another weighing operation.

The operation of the scales as a whole is briefly as follows:—The poise B being in the position in which it was left after the last weighing operation, and the person or article to be weighed being on the scale platform, the scale beam will be raised or depressed from the position of balance according as the weight of the person is greater or less than the weight corresponding to the position of the poise. If a coin be then dropped through the chute 64 it will cause the lever 60 to swing from the position shown in Fig. 1 and in full lines in Fig. 6 to the position shown in dotted lines in Fig. 6, thereby carrying the contact finger 61 into engagement with the contact spring 62, and moving spring 82 into its circuit closing position, and will be locked in such inclined position by means of the latch 65. The circuit will thus be completed to one or the other of the motor magnets 35 or 36 according to the position of the scale beam. If the scale beam is raised, for example, the circuit will be completed to the motor magnet 35 as follows, referring to the diagrammatic showing of the circuits in Fig. 6:— starting from the battery or other source of electrical energy S, by wire a to the fulcrum 10, thence through the scale beam 18, rack bar 22, pinion 31 and shaft 30 to the contact spring 45, and through the contact screw 47 and wire b to the magnet 35, and thence through wire c, contact spring 51, supporting bar 19, contacts 53 and 55, bar 59, wire d, contact spring 62, finger 61 and wire e back to the battery. The magnet 35 will thus be energized and the armature lever 41 oscillated and the poise will move outward along the scale beam until it reaches the position of balance, the circuit to the magnet 35 being then broken between the contacts 53 and 55.

When the beam balances the contact finger 70 will engage the contact spring 69 and circuit will be closed to the latch retracting magnet 68 as follows:—starting from the battery S by wire a to the fulcrum 10, thence through the scale beam 18, contact 70, contact spring 69, and wire f to the magnet 68, and thence by wire g back to the battery. The magnet 69 will thus be energized to move its armature 67 and retract the latch 65 to release the coin lever 60 and permit the latter to swing back to its normal position, thereby carrying the finger 61 away from the contact spring 62 and opening the operating circuit of the motor magnets. The movement of the armature 67 will also cause the signal bell to be sounded and the movement of the coin lever back to its normal position will then open the switch 82. The switch C will then remain open and further automatic movement of the poise will be prevented until the operating circuits for the motor magnets are again closed by the insertion of another coin.

If at the time the switch C is closed by the insertion of a coin the scale beam is depressed, the circuit will be completed to the motor magnet 36 to cause the poise to move inward along the beam, and the path of the current will be the same as stated for the motor magnet 35, except that from the shaft 30 the current will pass through the contact spring 46, contact screw 48 and wire b' to the magnet 36 and thence through wire c', contact spring 52, supporting bar 20 and contacts 54 and 56 to the bar 59.

It will be understood that the invention is not to be limited to the exact construction and arrangement of parts as shown and to which the foregoing description has been mainly confined, but that it includes changes and modifications thereof within the claims.

What is claimed is:—

1. In a self-poising beam scale, the combination with the scale beam, of a poise movable along the beam, a motor on the poise, and a reciprocating impulse imparting member actuated by said motor for moving the poise step by step along the beam, substantially as described.

2. In a self-poising beam scale, the combination with the scale beam, of a poise movable along the beam, an electric motor and connections for moving the poise along the beam, a contact device in the circuit to said motor controlled by the movement of the scale beam, electrically controlled means for opening the circuit to said motor, a circuit for said means, and a contact device in said circuit controlled by the movement of the scale beam to cause said electrically operated means to open the motor circuit when the beam is balanced, substantially as described.

3. In a self-poising beam scale, the combination with the scale beam, of a poise movable along the beam, an electric motor and connections for moving the poise along the beam, a contact device in the circuit to said motor controlled by the movement of the scale beam, a switch in said circuit, an electro-magnet and connections for opening said switch, and means controlled by the movement of the scale beam for closing the circuit to said magnet when the beam is balanced, substantially as described.

4. In a self-poising beam scale, the combination with the scale beam, of a poise movable along the beam, an electric motor and connections for moving the poise along the beam, a contact device in the circuit to said motor controlled by the movement of the scale beam, a switch in the motor circuit, a retaining device for holding the switch in position to close the circuit, an electro-magnet and connections for moving the retaining device to release the switch, and means controlled by the movement of the scale beam for closing the circuit to said magnet when the scale beam is balanced, substantially as described.

5. In a self-poising beam scale, the combination with the scale beam, of a poise movable along the beam, two independent motors on the poise, a driving pawl reciprocated by one of said motors for moving the poise along the beam in one direction, a second driving pawl reciprocated by the other of said motors for moving the poise along the beam in the other direction, means with which the pawls co-act to effect the movement of the poise, and means whereby interference by either of said pawls with the movement of the poise by the other of said pawls will be avoided, substantially as described.

6. In a self-poising beam scale, the combination with the scale beam, of a poise movable along the beam, two independent motors on the poise, a reciprocating impulse imparting member actuated by one of said motors for moving the poise along the beam in one direction, a second reciprocating impulse imparting member actuated by the other of said motors for moving the poise along the beam in the other direction, means with which said impulse imparting members co-act to effect the movement of the poise, and means whereby interference by either of said impulse imparting members with the movement of the poise by the other of said impulse imparting members will be avoided, substantially as described.

7. In a self-poising beam scale, the combination with the scale beam, of a poise movable along the beam, motor mechanism carried by the poise for moving the poise along the beam including a pair of oppositely acting driving pawls and means co-acting therewith for moving the poise in opposite directions, means for reciprocating said pawls independently, and means for holding either of said pawls in an inoperative position while the other of said pawls is being reciprocated to move the poise, substantially as described.

8. In a self-poising beam scale, the combination with the scale beam, of a poise movable along the beam, motor mechanism carried by the poise for moving the poise along the beam including a pair of oppositely acting driving pawls and means co-acting therewith for moving the poise in opposite directions, means for reciprocating said pawls independently, and means for engaging and raising the pawls when in their normal or retracted position, substantially as described.

9. In a self-poising beam scale, the combination with the scale beam, of a poise movable along the beam, a rotary member carried by the poise, connections between the rotary member and the beam whereby rotation of said member causes the poise to move along the beam, a wheel on said rotary member, a pair of oppositely acting driving pawls for rotating said rotary member in opposite directions by engagement with said wheel, means for reciprocating said pawls independently, and means for engaging said pawls when in their normal or retracted position to hold them out of engagement with said wheel, substantially as described.

10. In a self-poising beam scale, the combination with the scale beam, of a poise movable along the beam, means for automatically moving the poise to balancing position including an electric motor, an oscillating lever, means carried by said lever for closing the circuit to said motor when the lever is swung out of normal position, a retaining device for holding said lever in position to close the circuit, and means for preventing the retaining device from operating to hold the lever when the latter is caused to swing into its circuit closing position by the movement of the parts which support the lever, said means comprising a bar 75 arranged to swing with the lever and carrying a stop 76 adapted to engage the retaining device, substantially as described.

11. In a self-poising beam scale, the combination with the scale beam, of a poise movable along the beam, an electric motor and connections for moving the poise along the beam, a contact device in the circuit to said motor controlled by the movement of the beam to open the circuit when the beam moves toward its balanced position, a normally opened switch in said circuit, means for closing said switch, electrically operated means for opening said switch, and a contact device controlled by the movement of the scale beam for closing circuit to said electrically operated means when the poise is in its balanced position, substantially as described.

12. In a self-poising beam scale, the combination with the scale beam, of a poise movable along the beam, a pair of reciprocating electro-magnetic motors and connections on said poise for moving the poise along the beam in opposite directions, a contact device controlled by the movement of the beam for closing the circuit to one of said motors only when the beam is above its position of balance, a second contact device controlled by the movement of the beam for closing the circuit to the other of said motors only when the beam is below its position of balance, a normally opened switch for opening and closing said circuits, means for closing said switch, an electromagnet and connections for opening said switch, and a contact device controlled by the movement of the beam for closing the circuit to said magnet when the beam is in its balanced position, substantially as described.

13. In a self-poising beam scale, the combination with the scale beam, of a poise movable along the beam, a longitudinally extending rack on the scale beam, driving mechanism carried by the poise comprising a pinion 31 for engaging said rack, a wheel 39 through which the pinion is rotated, an electro-magnet 35, an armature lever 41, a pawl 37 carried by the armature lever 41 in position to engage the periphery of the wheel 39, and means for breaking the circuit to the magnet as the armature moves toward the magnet so as to cause a rapid reciprocation of the armature when the magnet is energized, substantially as described.

14. In a self-poising beam scale, the combination with the scale beam, of a poise movable along the beam, a longitudinally extending rack on the scale beam, driving mechanism carried by the poise comprising a pinion 31 for engaging said rack, a wheel 39 through which the pinion is rotated, two oppositely arranged electro-magnets 35 and 36, armature levers 41 and 42 respectively for said magnets, pawls 37 and 38 respectively carried by said armature levers for engaging the wheel 39 to rotate the same in opposite directions, and means included in the circuits to said magnets for breaking the circuits as the armatures move toward the magnets whereby when either magnet is energized its armature will be rapidly reciprocated, substantially as described.

15. In a self-poising beam scale, the combination with the scale beam, of a poise movable along the beam, a longitudinally extending rack on the scale beam, driving mechanism carried by the poise comprising a pinion 31 for engaging said rack, a wheel 39 through which the pinion is rotated, two oppositely arranged electro-magnets 35 and 36, armature levers 41 and 42 respectively for said magnets, pawls 37 and 38 respectively carried by said armature levers for engaging the wheel 39 to rotate the same in opposite directions, and a stop plate 40 against which said armatures are held in their normal or retracted position under spring tension and by which the pawls are held normally out of engagement with the wheel 39, substantially as described.

16. In a self-poising beam scale, the combination with a scale beam having a pair of insulated supporting bars 19 and 20, of a poise mounted on but insulated from said supporting bars to move along the beam, two independent electric motors on the poise for moving the poise in opposite directions on the beam, two running contact devices carried by the poise, one being in engagement with each of the supporting bars 19 and 20, connections for completing the circuit to one of said electric motors through the supporting bar 19 and the contact device engaging said bar, and connections for completing the circuit to the other of said electric motors through the supporting bar 20 and the contact device engaging said bar, substantially as described.

17. In a self-poising beam scale, the combination with the scale beam, of a poise movable along the beam, means for automatically moving the poise to balancing position, means controlled by the beam for making a signal when the beam comes to balancing position, and means for automatically preventing operation of the signaling means after a signal has been made and until the next weighing operation, substantially as described.

18. In a self-poising beam scale, the combination with the scale beam, of a poise movable along the beam, an electric motor and connections for moving the poise along the beam, a contact device in the circuit to said motor controlled by the movement of the scale beam, a switch in said circuit, an electro-magnet and connections for opening said switch, means controlled by the movement of the scale beam for closing the circuit to said magnet when the beam is balanced, a signaling device actuated by said magnet, and means for automatically opening the circuit to said magnet after said switch has been opened and the signal made, substantially as described.

In testimony whereof, I have hereunto set my hand, in the presence of two subscribing witnesses.

WILLIAM W. ROSENFIELD.

Witnesses:
A. L. KENT,
T. F. KEHOE.